United States Patent Office 2,979,544
Patented Apr. 11, 1961

2,979,544

PROCESS FOR THE PRODUCTION OF CYCLODO-DECATRI-(1,5,9)-ENES CONCURRENTLY WITH OTHER CYCLIC HYDROCARBONS

Günther Wilke, Mulheim (Ruhr), Germany, assignor to Studiengesellschaft Kohle m.b.H., Mulheim (Ruhr), Germany No Drawing. Filed Apr. 15, 1958, Ser. No. 728,541

Claims priority, application Germany Apr. 17, 1957

11 Claims. (Cl. 260—666)

This invention relates to a process for the production of cyclododecatri-(1,5,9)-enes concurrently with other cyclic hydrocarbons.

The copending application No. 641,252, filed February 20, 1957, relates to a process for the production of cyclododecatri-1,5,9-enes concurrently with other cyclic hydrocarbons with at least eight carbon atoms and at least two double bonds in the ring, wherein a diolefine, preferably isoprene, piperylene or advantageously butadiene, is subjected to the action of a catalyst comprising a titanium halide and an alkyl aluminium halide at a temperature between −20 and 150° C., preferably in the presence of a solvent, such as an aliphatic or aromatic hydrocarbon or a halogenated hydrocarbon. In this process, it is advantageous to use a molar ratio between titanium and aluminium in the catalysts between 1:2.3 and 1:4.7.

It has now been found that the preferential formation of cyclododecatri-(1,5,9)-enes also takes place if the catalysts used comprise mixtures of titanium halides, especially titanium tetrachloride, with aluminium trialkyls or dialkyl aluminium hydrides, in which the molar ratio between titanium and aluminium is from 1:0.5 to 1:2.0, advantageously 1:1.

According to the invention, the organic aluminium compounds obtained according to German Patent No. 961,537 can be used directly as catalyst constituents.

The following examples further illustrate the invention.

*Example 1*

0.7 cc. (0.0064 mol) of TiCl$_4$ are dissolved in 100 cc. of absolute benzene, and 0.88 cc. (0.0064 mol) of aluminium triethyl are added while stirring. Pure butadiene is introduced into this mixture, the temperature rising to 50° C. The introduction of butadiene is continued, and the temperature is kept between 40 and 50° C. by cooling. In the course of 3 hours, 68 g. of butadiene are taken up, the mixture becoming highly viscous. The catalyst is decomposed with 2 cc. of methanol and the polybutadiene formed is precipitated from the solution with acetone. 18 g. of polymer are obtained. The solution is washed with water, dried and distilled. 30 cc.—26.5 g. of cyclododecatri-(1,5,9)-ene distil over at B. P.$_{.15\ mm.}$=108° C. 3 g. of high-boiling residue remain. The yield of cyclododecatriene is 60%, based on reacted butadiene.

*Example 2*

The procedure of Example 1 is followed, but aluminium triisobutyl is used as organometallic component. Cyclododecatri-(1,5,9)-ene is obtained in a yield of 65%.

*Example 3*

The procedure of Example 1 is followed, but 0.67 cc. (0.0064 mol) of diethyl aluminium hydride is used as catalyst. Over a period of 40 minutes, with cooling of the reaction mixture to 50° C., 85 g. of butadiene are taken up. The mixture is worked up as described in Example 1. The yield of cyclododecatri-(1,5,9)-ene is 70% of the reacted butadiene.

*Example 4*

A catalyst is produced as in Example 1 and the mixture obtained is heated to 40–50° C. 50 g. of pure isoprene are added dropwise to the catalyst suspension and the mixture is stirred vigorously for 12 hours at 40–50° C. The mixture is worked up in the usual way. By distillation, trimethyl cyclododecatri-(1,5,9)-ene is obtained as $C_{15}$-fraction, B.P.$_{.13\ mm.}$=138° C., $n_D^{20}$=1.5120, the methyl groups thereof being on the double-bond carbon atoms. Yield: 40–50%.

*Example 5*

The procedure adopted is described in Example 4, but piperylene is used for trimerisation. Trimethyl cyclododecatri-(1,5,9)-ene is obtained, B.P.$_{.2.5\ mm.}$=92–94° C., $n_D^{20}$=1.4910–1.4930, the methyl groups thereof being on the carbon atoms adjacent to the double bonds.

*Example 6*

4.5 cc.=3.66 g. (0.01 mol) of a mixed aluminium trialkyl, which was obtained in the course of a synthesis reaction of aluminium tripropyl with ethylene to give a statistical average of $C_7$–$C_9$ alkyls (7.8% Al), are dissolved in 150 cc. of absolute benzene in a nitrogen atmosphere. 0.9 cc.=1.9 g. (0.01 mol) of titanium tetrachloride are added dropwise to this solution. A dark brown catalyst suspension is obtained; this is heated to 40° C. and butadiene is introduced while stirring vigorously. By cooling, the temperature is kept at 40° C. The mixture becomes viscous and over a period of 1 hour takes up 116 g. of butadiene. The flow of gas is shut off and the mixture is kept for another hour at 40° C. The catalyst is then decomposed with methanol, the polybutadiene which is formed is precipitated with excess methanol and the solution is worked up in the usual way by distillation. 82 g.=76% of the reacted butadiene is obtained as trans-trans-cis-cyclododecatri-(1,5,9)-ene, as well as dimers (vinyl cyclohexene and cyclooctadi-(1,5)-ene) and polybutadiene.

*Example 7*

The procedure is as described in Example 6, but aluminium triisobutyl in the molar ratio of Al:Ti of 1:1 is used as organic aluminium component. Cyclododecatriene is obtained in a yield of 75% of the reacted butadiene.

*Example 8*

The procedure is as described in Example 6, but hexane is used as solvent. Yield of cyclododecatriene: 60%.

*Example 9*

The procedure is as described in Example 6, but chlorobenzene is used as solvent. Yield of cyclododecatriene=73%.

What I claim is:

1. Process for the production of cyclododecatri-(1,5, 9)-enes which comprises contacting a member selected from the group consisting of butadiene, isoprene, and piperylene with a catalyst comprising a titanium halide and an aluminum compound selected from the group consisting of aluminum trialkyls and dialkyl aluminium hydrides with the molar ratio of Ti to Al in said catalyst being between 1:0.5 and 1:2.0, to thereby form cyclododecatri-(1,5,9)-enes with other cyclic hydrocarbons containing at least 8 carbon atoms and at least 2 double bonds in the ring.

2. Process according to claim 1 in which said contacting is effected in an inert gas atmosphere.

3. Process according to claim 1 in which said titanium halide is a member selected from the group consisting of divalent, trivalent, and tetravalent titanium halide.

4. Process according to claim 3 in which said titanium halide is a titanium chloride.

5. Process according to claim 1 in which the molar ratio of titanium to aluminum in the catalyst is 1:1.

6. Process according to claim 1 in which said contacting is effected at room temperature.

7. Process according to claim 1 in which said contacting is effected at a temperature of about 40 degrees C.

8. Process according to claim 1 in which said contacting is effected at a temperature between about $-20$ to $+50$ degrees C.

9. Process according to claim 1 in which said contacting is effected in the presence of nitrogen.

10. Process according to claim 1 in which said contacting is effected in the presence of an organic chemically inert solvent.

11. Process according to claim 9 in which said solvent is a member selected from the group consisting of aliphatic hydrocarbons, aromatic hydrocarbons, and halogenated hydrocarbons.

References Cited in the file of this patent

UNITED STATES PATENTS

| | | |
|---|---|---|
| 2,402,875 | Cornell | June 25, 1946 |
| 2,686,208 | Reed | Aug. 10, 1954 |
| 2,686,209 | Reed | Aug. 10, 1954 |
| 2,851,505 | Henke et al. | Sept. 9, 1958 |
| 2,868,771 | Ray et al. | Jan. 13, 1959 |

FOREIGN PATENTS

| | | |
|---|---|---|
| 533,362 | Belgium | May 16, 1955 |
| 538,782 | Belgium | Dec. 6, 1955 |

UNITED STATES PATENT OFFICE
CERTIFICATION OF CORRECTION

Patent No. 2,979,544

April 11, 1961

Günther Wilke

It is hereby certified that error appears in the above numbered patent requiring correction and that the said Letters Patent should read as corrected below.

Column 3, line 11, for "+50 degrees C." read -- +150 degrees C. --; line 17, for the claim reference numeral "9" read -- 10 --.

Signed and sealed this 5th September 1961.

(SEAL)
Attest:

ERNEST W. SWIDER
Attesting Officer

DAVID L. LADD
Commissioner of Patents